(12) United States Patent
Lestoquoy

(10) Patent No.: US 9,959,972 B2
(45) Date of Patent: May 1, 2018

(54) INDUCTOR SYSTEM HAVING SHARED MATERIAL FOR FLUX CANCELLATION

(71) Applicant: WITRICITY CORPORATION, Watertown, MA (US)

(72) Inventor: Guillaume Lestoquoy, Cambridge, MA (US)

(73) Assignee: WITRICITY CORPORATION, Watertown, MA (US)

( * ) Notice: Subject to any disclaimer, the term of this patent is extended or adjusted under 35 U.S.C. 154(b) by 0 days. days.

(21) Appl. No.: 15/671,680

(22) Filed: Aug. 8, 2017

(65) Prior Publication Data

US 2018/0040416 A1   Feb. 8, 2018

Related U.S. Application Data

(60) Provisional application No. 62/372,034, filed on Aug. 8, 2016.

(51) Int. Cl.
*H01F 27/38* (2006.01)
*H02J 7/00* (2006.01)

(52) U.S. Cl.
CPC .............. *H01F 27/385* (2013.01); *H02J 7/00* (2013.01)

(58) Field of Classification Search
CPC ........ H01F 27/00; H01F 27/385; H01F 27/40; H01F 27/42; H01F 27/425; H04M 19/003; H02M 3/1588; H02M 1/38; H02M 2001/0048; H01S 5/042; H03K 17/165
USPC ................. 323/356; 318/400.4, 400.35, 780; 307/104
See application file for complete search history.

(56) References Cited

U.S. PATENT DOCUMENTS

| 4,172,215 A | 10/1979 | Yamashita |
| 2009/0267718 A1 | 10/2009 | Nagano et al. |
| 2013/0033118 A1 | 2/2013 | Karalis et al. |
| 2014/0043127 A1 | 2/2014 | Worek et al. |
| 2014/0049118 A1* | 2/2014 | Karalis ................... H01F 38/14 307/104 |
| 2014/0247192 A1 | 9/2014 | Ikemoto |

(Continued)

FOREIGN PATENT DOCUMENTS

| EP | 2 523 197 A1 | 11/2012 |
| JP | H05244028 | 9/1993 |

OTHER PUBLICATIONS

Biela, et al.; "Optimal Design of a Compact 99.3% Efficient Single-Phase PFC Rectifier"; Applied Power Electronics Conference and Exposition (APEC); pp. 1397-1404; Feb. 21-25, 2010; 8 Pages.

(Continued)

*Primary Examiner* — Yemane Mehari
(74) *Attorney, Agent, or Firm* — Daly, Crowley, Mofford & Durkee, LLP

(57) ABSTRACT

Methods and apparatus for flux cancellation includes first and second inductors, wherein the first inductor is configured for coupling to a first energy source and the second inductor is configured for coupling to a second energy source. A layer of magnetic material is disposed between the first and second inductors, wherein the first and second inductors are configured such that, when driven with an oscillating current, magnetic flux generated by the first inductor is substantially canceled by magnetic flux generated by the second inductor in the layer of magnetic material.

20 Claims, 10 Drawing Sheets

(56) References Cited

U.S. PATENT DOCUMENTS

| | | | | |
|---|---|---|---|---|
| 2017/0126069 A1* | 5/2017 | Martin | ............... | H02J 50/12 |
| 2017/0256991 A1* | 9/2017 | Bronson | ............... | H02J 50/12 |
| 2017/0324351 A1* | 11/2017 | Rochford | ............... | G05F 1/10 |
| 2018/0006566 A1* | 1/2018 | Bronson | ............... | H02M 3/1588 |

OTHER PUBLICATIONS

Jang, et al.; "Bridgeless PFC boost rectifier with optimized magnetic utilization"; 2008 Twenty-Third Annual IEEE Applied Power Electronics Conference and Exposition, Austin, TX; pp. 1017-1021; Feb. 24-28, 2008; 6 Pages.

Kang et al.; "Implementation of a 2-in-1 transformer combined with a PFC inductor and an LLC transformer for PSUs"; 2014 IEEE Applied Power Electronics Conference and Exposition—APEC 2014, Fort Worth, TX; pp. 3385-3391; Mar. 16-20, 2014; 7 Pages.

Maeda, et al.; "Characteristics of an EIE-core variable inductor"; Electrical Engineering in Japan, vol. 144, Issue 2; pp. 22-33; Jul. 30, 2003; 12 Pages.

Ouyang, et al.; "Planar Integrated Magnetics Design in Wide Input Range DC-DC Converter for Fuel Cell Application"; 2010 IEEE Energy Conversion Congress and Exposition; pp. 4611-4618; Sep. 12-16, 2010; 8 Pages.

Ouyang, et al.; "Fully Integrated Planar Magnetics for Primary-Parallel Isolated Boost Converter"; 2011 Twenty-Sixth Annual IEEE Applied Power Electronics Conference and Exposition (APEC); pp. 174-181; Mar. 6-11, 2011; 8 Pages.

Ouyang, et al.; "Planar-Integrated Magnetics (PIM) Module in Hybrid Bidirectional DC-DC Converter for Fuel Cell Application"; IEEE Transactions on Power Electronics, vol. 26, No. 11; pp. 3254-3264; Nov. 2011; 11 Pages.

Ouyang, et al.; "Analysis and Design of Fully Integrated Planar Magnetics for Primary—Parallel Isolated Boost Converter"; IEEE Transactions on Industrial Electronics, vol. 60, No. 2; pp. 494-508; Feb. 2013; 15 Pages.

PCT Search Report & Written Opinion dated Oct. 11, 2017 From International Application No. PCT/US2017/045901; 13 Pages.

Choi: "Design Considerations for an LLC Resonant Converter"; Fairchild Power Seminar 2007; 9 pages.

Ouyang et al.: "Analysis and Design of Fully Integrated Planar Magnetics for Primary—Parallel Isolated Boost Converter"; IEEE Transactions on Industrial Electronics, vol. 60, No. 2, Feb. 2013; p. 494-508 (15 pages).

Chen et al.: "Design and magnetics optimization of LLC resonant converter with GaN"; Texas Instruments; 2017 IEEE; p. 94-98 (5 pages).

* cited by examiner

Separate identical inductors

Inductors perfectly pressed together:
flux cancellation in shared side

Paired inductors with thin shared center plate

INDUCTOR SYSTEM HAVING SHARED MATERIAL FOR FLUX CANCELLATION

CROSS REFERENCE TO RELATED APPLICATIONS

The present application claims the benefit of U.S. Provisional Patent Application No. 62/372,034 filed on Aug. 8, 2016, which is incorporated herein by reference.

SUMMARY

Inductors may be used in wide variety of electrical circuits for various reasons, such as to filter signals. Highly resonant wireless power transfer systems can also include inductors that form part of impedance matching networks for transmitting and/or receiving energy. These inductors may also be required for the adequate filtering of harmonics in input and/or output currents of the system. For high power wireless power transmission systems, for example, transferring 3 kW and greater, the inductors may be of relatively large size to achieve desired operating characteristics. To maintain impedance balancing, the total inductance is split into two equal inductors of half the desired value, such as by building two separate, identical inductors located on each of the AC lines coming in and out of the system.

Power transfer systems may rely on electronic circuits such as rectifiers, AC (Alternating Current) to DC (Direct Current) converters, impedance matching circuits, and other power electronics to condition, monitor, maintain, and/or modify the characteristics of the voltage and/or current used to provide power to electronic devices. Power electronics can provide power to a load with dynamic input impedance characteristics. Impedance matching networks may include inductors, such as RF choke inductors: of relatively large size to provide desired filtering and operating characteristics.

In embodiments, an inductor system includes first and second inductors positioned with respect to each other so as to share an amount of magnetic material, such as ferrite. In one embodiment, a planar piece of ferrite is sandwiched between first and second inductors. Sharing of the ferrite material by the first and second inductors can reduce a total volume, weight, and cost of the ferrite material and reduce magnetic losses compared to conventional configurations having separate inductor/ferrite arrangements. In embodiments, the inductor system includes first and second inductors have substantially the same impedance, where the respective impedances are defined in part by the shared ferrite, which provides flux cancellation.

As will be readily appreciated by one of ordinary skill in the art, it may be desirable to provide balanced inductors that minimize volume, and thus weight and cost, and maximize efficiency while fulfilling other design constraints, such as current/voltage ratings, thermal management, and the like. In embodiments, paired inductor packages with shared ferrite reduce the amount of heat dissipated and promote efficient circuit operation. It is understood that as used herein balanced or matched inductors do not require exact matching of impedance. Rather, as used herein, an inductor system with shared ferrite requires some flux cancellation in the shared ferrite layer.

While example embodiments of the invention are primarily shown and described in conjunction with ferrite layers sandwiched between inductors, it is understood that any suitable magnetic material with acceptable permeability at operational frequencies can be used to meet the needs of a particular application. In embodiments, anisotropic materials, for example, can be used.

In one aspect, a system comprises: a first inductor driven by a first oscillating current generated by a first energy source; a second inductor driven by a second oscillating current generated by a second energy source, and a layer of magnetic material disposed between the first inductor and the second inductor, wherein the first and second inductors are configured such that, when each is driven with its respective oscillating current, magnetic flux generated by the first inductor is substantially canceled by magnetic flux generated by the second inductor in the layer of magnetic material.

A system may include one or more of the following features: the first and second inductors are disposed in first and second E-shaped cores, respectively, the magnetic material layer in combination with the first and second inductors determine respective inductances of first and second inductors during operation of the system, a net of the canceled flux from the first and second inductors is substantially zero in a portion of the magnetic material layer when the oscillating current through each of the first and second inductors substantially matches, the first and second inductors are located under a source coil of a wireless resonant power transmitter, the power transmitter forms a part of a charging platform, the first and second inductors comprise respective planar windings, and/or the layer of magnetic material is shared with further circuit components.

In another aspect, a method comprises: disposing a layer of magnetic material between first and second inductors, wherein the first inductor is electrically coupled to a first energy source and the second inductor is electrically coupled to a second energy source; and driving with an oscillating current the first and second inductors such that a first magnetic flux generated by the first inductor is canceled by a second magnetic flux generated by the second inductor, wherein the magnetic material layer in combination with the first and second inductors determine respective inductances of first and second inductors during operation of the system.

A method can include one or more of the following features: the first and second inductors are disposed in first and second E-shaped cores, respectively, the magnetic material layer in combination with the first and second inductors determine respective inductances of first and second inductors during operation of the system, a net of the canceled flux from the first and second inductors is substantially zero in a portion of the magnetic material layer when the oscillating current through each of the first and second inductors substantially matches, the first and second inductors are located under a source coil of a wireless resonant power transmitter, the power transmitter forms a part of a charging platform, the first and second inductors comprise respective planar windings, and/or the layer of magnetic material is shared with further circuit components.

In a further aspect, a system comprises: a first inductor driven by a first oscillating current; a second inductor driven by a second oscillating current and substantially decoupled from the first inductor; and a layer of magnetic material disposed between the first inductor and the second inductor; wherein when the first and second inductors are driven with their respective oscillating current, magnetic flux generated by the first inductor is substantially canceled by magnetic flux generated by the second inductor in the layer of magnetic material.

A system may include one or more of the following features: the first and second inductors are disposed in first and second E-shaped cores, respectively, a net of the canceled flux from the first and second inductors is substantially zero in a portion of the magnetic material layer when the oscillating current through each of the first and second inductors substantially matches, and/or the magnetic material layer in combination with the first and second inductors determine respective inductances of first and second inductors during operation of the system.

BRIEF DESCRIPTION OF THE DRAWINGS

The foregoing features of this invention, as well as the invention itself, may be more fully understood from the following description of the drawings in which.

DETAILED DESCRIPTION

This disclosure provides embodiments for a system, such as a wireless power transfer system, having an inductor system with two or more inductors that share a portion of magnetic material, such as ferrite, such that, when driven with oscillating current, the respective windings of the two or more inductors are configured to provide substantial magnetic flux cancellation in the magnetic material layer. The inductor system may require a relatively thin layer of ferrite, for example, due to the mutual flux cancellation of the first and second inductors. As described more fully below, the flux cancellation in the ferrite layer can contribute to the respective inductance values and/or impedances of the first and second inductors. That is, the first and second inductors require each other and the shared ferrite to achieve the desired operating characteristics. In embodiments, substantial magnetic flux cancellation can mean, on average, greater than 75%, 80%, 90%, 96%, 95%, or 99% of magnetic flux occurring in the shared magnetic material is cancelled by opposing magnetic flux. In embodiments, flux cancellation can occur in portions of the shared magnetic material. In other words, flux cancellation may occur inhomogenously or inconsistently throughout the volume of the shared magnetic material. For example, the magnetic flux may be substantially cancelled near the center of the volume of the shared magnetic material while some flux may not be cancelled near the edges of the volume of the shared magnetic material (thus, resulting in some non-zero net magnetic flux in a portion of the volume of the shared magnetic material).

Figure 1:
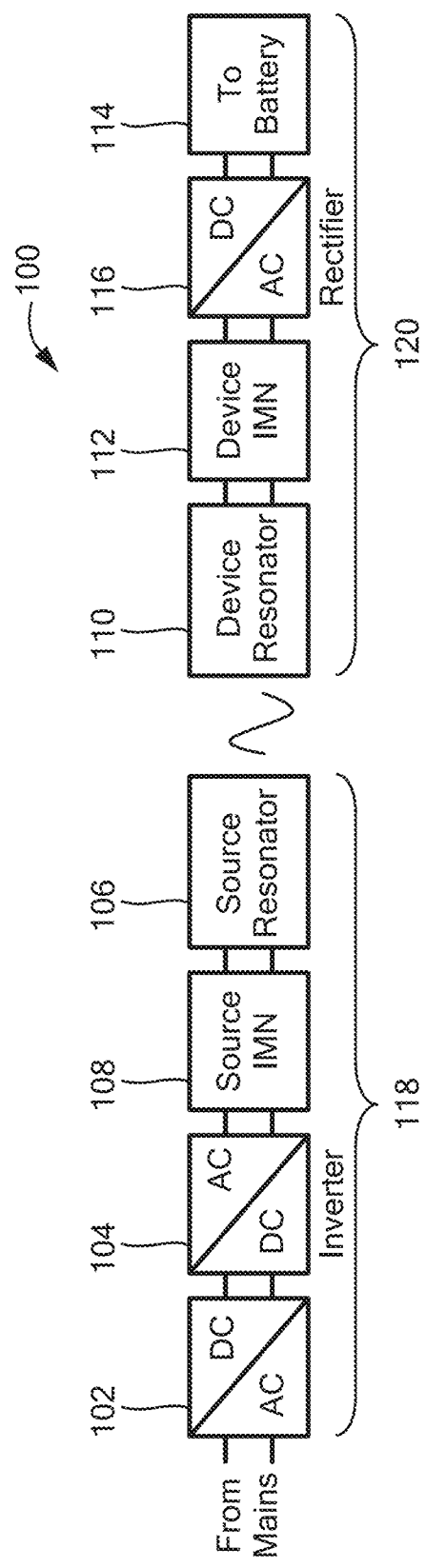
FIG. 1 is a schematic representation of a wireless energy transfer system that may have inductors with flux cancellation.

FIG. 1 shows a high level functional block diagram of an exemplary embodiment of a wireless power transfer system 100 having an inductor system with shared ferrite for flux cancellation, as described more fully below. Input power to the system can be provided by wall power (AC mains), for example, which is converted to DC in an AC/DC converter block 102. Alternatively, a DC voltage can be provided directly from a battery or other DC supply. In embodiments, the AC/DC converter block 102 may be a power factor correction (PFC) stage. The PFC, in addition to converting the AC input (for example, at 50 or 60 Hz) to DC, can condition the current such that the current is substantially in phase with the voltage. A high efficiency switching inverter or amplifier 104 converts the DC voltage into an AC voltage waveform used to drive a source resonator 106. In embodiments, the frequency of the AC voltage waveform may be in the range of 80 to 90 kHz. In embodiments, the frequency of the AC voltage waveform may be in the range of 10 kHz to 15 MHz. In one particular embodiment, the frequency of the AC voltage waveform is about 6.78 MHz that may vary within a 15 kHz band due to FCC and CISPR regulations, for example. A source (transmitter) impedance matching network (IMN) 108 efficiently couples the inverter 104 output to the source resonator 106 and can enable efficient switching-amplifier operation. Class D or E switching amplifiers are suitable in many applications and can require an inductive load impedance for highest efficiency. The source IMN 108 transforms the source resonator impedance into such an impedance for the inverter 104. The source resonator impedance can be, for example, loaded by coupling to a device (receiver) resonator 110 and/or output load. The magnetic field generated by the source resonator 106 couples to the device resonator 110, thereby inducing a voltage. This energy is coupled out of the device resonator 110 to, for example, directly power a load or charge a battery. A device impedance matching network (IMN) 112 can be used to efficiently couple energy from the device resonator 110 to a load 114 and optimize power transfer between source resonator 106 and device resonator 110. It may transform the actual load impedance into an effective load impedance seen by the device resonator 110 which more closely matches the loading for optimum efficiency. For loads requiring a DC voltage, a rectifier 116 converts the received AC power into DC. In embodiments, the source (transmitter) 118 and device (receiver) 120 can each further include filters, sensors, and other components.

The impedance matching networks (IMNs) 108, 112 can be designed to maximize the power delivered to the load 114 at a desired frequency (e.g., 80-90 kHz, 100-200 kHz, 6.78 MHz) or to maximize power transfer efficiency. The impedance matching components in the IMNs 108, 112 can be chosen and connected so as to preserve a high-quality factor (Q) value of resonators 106, 110.

The IMNs' (108, 112) components can include, for example, a capacitor or networks of capacitors, an inductor or networks of inductors, or various combinations of capacitors, inductors, diodes, switches, and resistors. The components of the IMNs can be adjustable and/or variable and can be controlled to affect the efficiency and operating point of the system. Impedance matching can be modified by varying capacitance, varying inductance, controlling the connection point of the resonator, adjusting the permeability of a magnetic material, controlling a bias field, adjusting the frequency of excitation, and the like. It is understood that for a system with fixed matching (e.g., fixed inductance, capacitance, etc.) with fixed frequency, fixed input voltage, etc., still performs impedance matching. Varying frequency, input voltage, components effective value can change the matching and/or the output. The impedance matching can use or include any number or combination of varactors, varactor arrays, switched elements, capacitor banks, switched and tunable elements, reverse bias diodes, air gap capacitors, compression capacitors, barium zirconium titanate (BZT) electrically tuned capacitors, microelectromechanical systems (MEMS)-tunable capacitors, voltage variable dielectrics, transformer coupled tuning circuits, and the like. The variable components can be mechanically tuned, thermally tuned, electrically tuned, piezo-electrically tuned, and the like. Elements of the impedance matching can be silicon devices, gallium nitride devices, silicon carbide devices, and the like. The elements can be chosen to withstand high currents, high voltages, high powers, or any combination of current, voltage, and power. The elements can be chosen to be high-Q elements.

Figure 2:
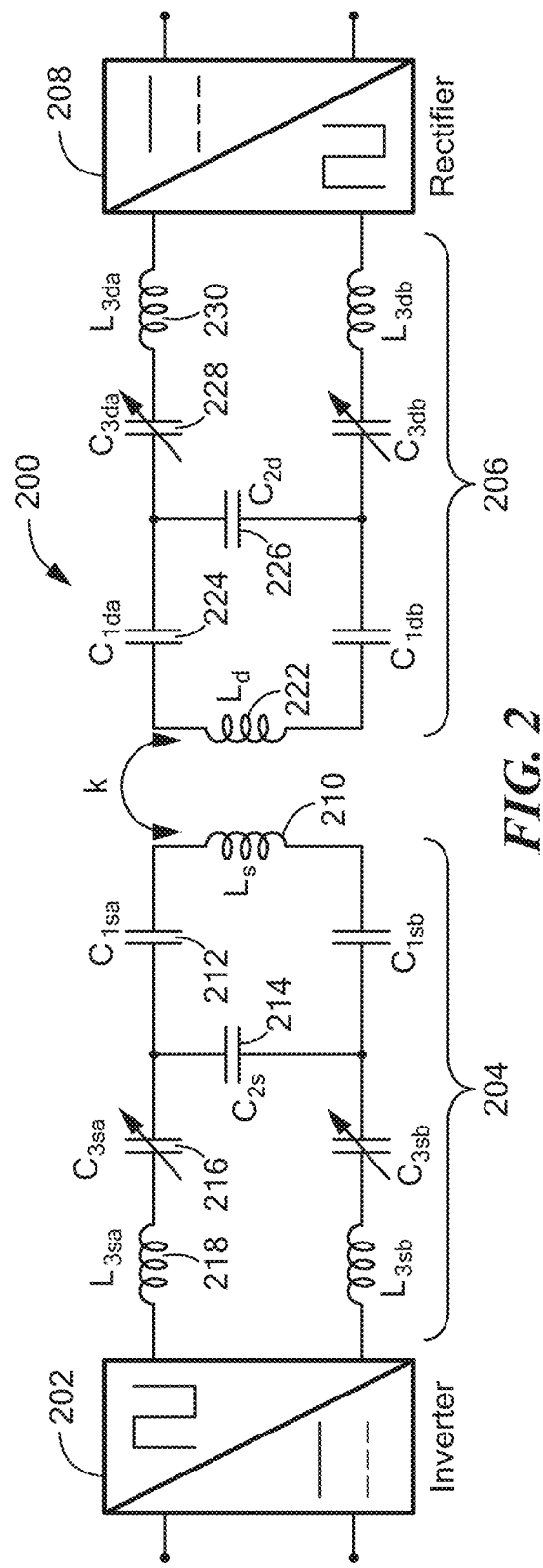
FIG. 2 is a schematic of a circuit implementation of a wireless energy transfer system with inductors with flux cancellation.

FIG. 2 shows an exemplary embodiment of a wireless power transmission system 200 having an inverter 202 powering source or transmitter-side circuit (which includes source resonator and source IMN) 204, which couples, with coupling factor k, oscillating electromagnetic energy to the device or receiver-side circuit (which includes device resonator and device IMN) 206 with balanced inductors $L_{3da}$ and $L_{3db}$ with flux cancellation in accordance with example embodiments of the invention. In practical embodiments of the invention, an inductor may be split into balanced inductors $L_{3Sa}$ and $L_{3Sb}$, as shown and described more fully below, to provide flux cancellation, as well as decoupling and desirable filtering and common mode rejection characteristics. Device side inductor $L_{3d}$ can also be split into $L_{3da}$ and $L_{3db}$, as shown. In example embodiments, voltage regulation in the power receiver is achieved through any suitable wireless communication channel, such as radio, WiFi, and the like. In one particular embodiment, communication with the power receiver comprises a relatively slow WiFi loop that instructs the power transmitter to adjust its resonator's field strength by varying the DC bus voltage driving the amplifier. The oscillating energy is then converted by the rectifier 208. The source-side circuit 204 components include source resonator coil $L_s$ 210, series capacitors $C_{1sa}$ 212 (in position 1), parallel capacitor $C_{2s}$ 214 (in position 2), and capacitors $C_{3sb}$ 216 and inductor $L_{3sa,b}$ 218 (in position 3). In the illustrative embodiment, capacitor $C_{1sa}$ 216 can include one or more variable capacitors. Note that each of the components listed may represent networks or groups of components and that components in at least positions 1 and 3 can be balanced. The device-side circuit 206 components can include device resonator coil $L_d$ 222, series capacitors $C_{1da}$ 224 (in position 1), parallel capacitor $C_{2d}$ 226 (in position 2), and capacitors $C_{3db}$ 228 and inductor $L_{3da,b}$ 230 (in position 3). The capacitor $C_{3sa}$ 216 can include one or more variable capacitors, such as a PWM controlled capacitor, switched bank of capacitors, and varactors. The one or more variable capacitors can be discretely or continuously tunable capacitors. It is understood that any capacitor or no capacitors can include variable capacitance to meet the needs of a particular application.

It is understood that the source and/or device impedance matching networks (IMNs) can have a wide range of circuit implementations with various components having impedances to meet the needs of a particular application. U.S. Pat. No. 8,461,719 to Kesler et al., which is incorporated herein by reference, discloses a variety of tunable impedance networks, such as in FIGS. 28a-37b, for example. It is further understood that any practical number of switched capacitors can be used on the source and/or device side to provide desired operating characteristics. In addition, while illustrative embodiments are shown and described in conjunction with highly resonant wireless energy transfer systems, it is understood that inductors having a ferrite (or other material) layer sandwiched between the respective first and second inductor windings wound to provide mutual flux cancellation are applicable to circuits in general in which it is desirable to achieve space reduction, decoupling, and/or efficient circuit operation.

Referring again to FIG. 2, in the illustrated embodiment, the balanced inductors $L_{3sa}$, $L_{3sb}$ each provide about 25 µH of inductance. In one particular embodiment, the inductors can handle up to about 50 A current. As described more fully below, the balanced inductors $L_{3sa}$, $L_{3sb}$ can share a layer of magnetic material to provide flux cancellation.

It will be appreciated that shape and dimensions of the balanced inductors may be of interest in practical embodiments. For example, a low profile inductor may be desirable to place the inductor under a source coil of a power transmitter PT (FIG. 3) and minimize the overall height.

An inductor refers to a passive two-terminal device that stores electrical energy in a magnetic field when an alternating current flows through the coil of the inductor. Current flowing through the coil results in a time-varying magnetic field that induces a voltage in the conductor. As will be appreciated, an inductor can include a magnetic core comprising a ferromagnetic or ferrimagnetic material, such as iron or ferrite to increase the inductance. A magnetic core can increase the inductance of a coil by a factor of several thousand by increasing the magnetic field due to its higher magnetic permeability. It is understood that if the current through a ferromagnetic core coil reaches certain level the magnetic core may saturate so that the inductance does not remain constant. For higher frequency applications, inductor cores typically comprise ferrite, which is a nonconductive ceramic ferrimagnetic material.

It is understood that a transformer refers to a device that transfers energy from a primary winding to one or more secondary windings. The primary winding is coupled to an energy source such that a varying current in the primary winding produces a varying magnetic field that induces a voltage in the coupled secondary coil. The primary and secondary windings of a transformer must be coupled, where coupling may be close to 1.

In contrast to transformers, in embodiments of the invention two inductors are decoupled. For example, coupling of the inductors may be below 0.04. In embodiments, decoupling of the inductors is achieved by the shared ferrite.

Figure 3:
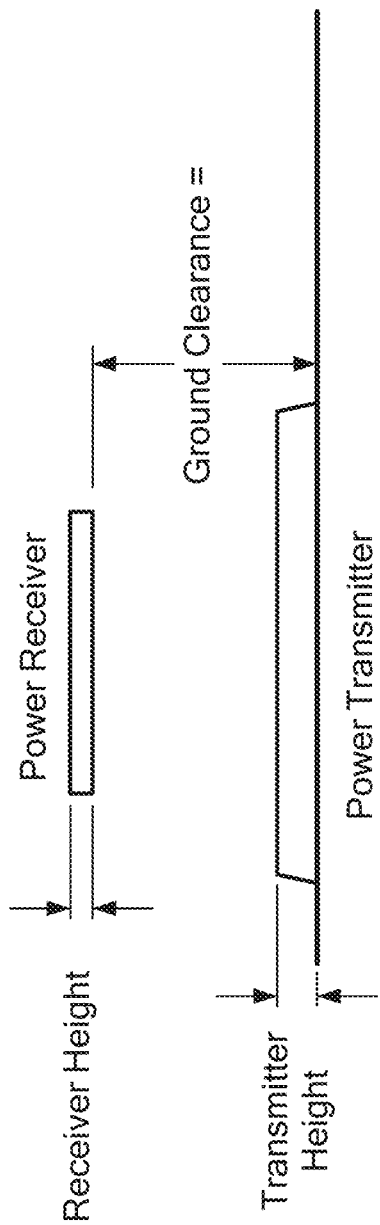
FIG. 3 is a schematic representation of power receivers and power transmitters that may have inductors with a shared ferrite layer.

FIG. 3 shows a power receiver proximate a charging platform of a power transmitter. In embodiments, a power transmitter interacts with a power receiver. As the receiver is placed on or around a transmitter, load impedance can be impacted. As described more fully below, an inductor system having windings with a shared ferrite layer and mutual flux cancellation may allow lower profile power transmitter's and/or power receivers by reducing the amount of space required for inductor elements. In embodiments, power transmitters provide relatively high power energy transfer, such as for charging electric vehicles. It will be appreciated that reducing the size and/or weight of a high power charging station is often desirable. In an illustrative embodiment, a power receiver has a height of about 2 cm and a power transmitter has a height of about 5 cm, with a ground clearance that can range from about 10 cm to about 25 cm. It is understood that these dimensions are merely illustrative.

Figure 4A:
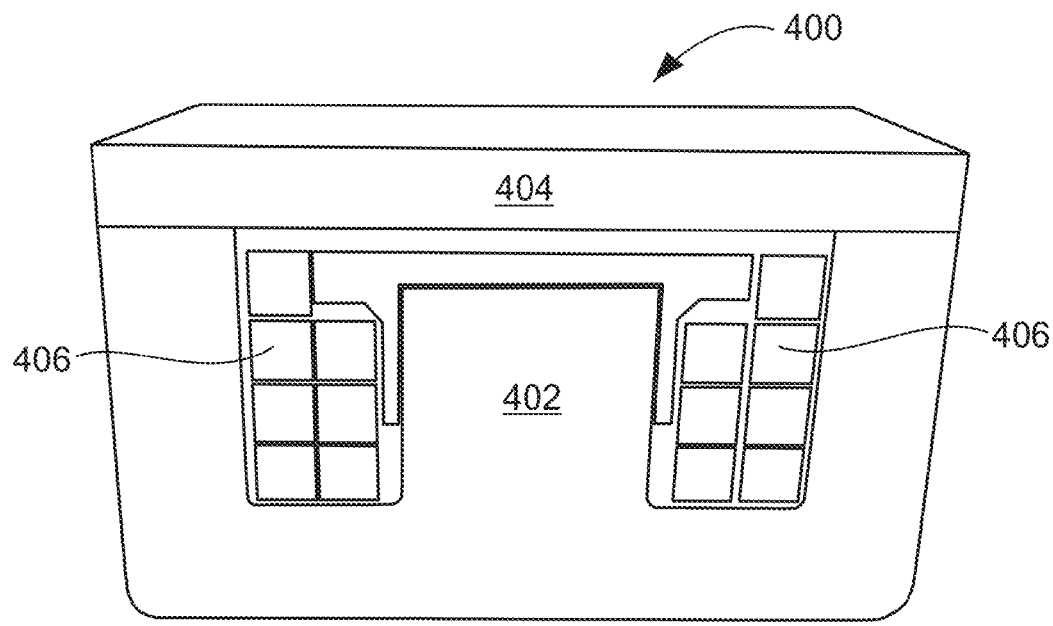
FIG. 4A is a pictorial representation of a core coupled to a ferrite layer that can form part of an inductor system having flux cancellation.

FIG. 4A shows a portion of a balanced inductor system 400 having a core 402 with a profile similar to that of a capital letter "E." The portion 400 includes a ferrite layer 404 coupled to the core 402. Placeholder material 406 is disposed in area adjacent the core to facilitate placing windings about the core 402. The ferrite layer 404 is secured to the core 402 to contain the windings. In embodiments, the inductor system can include an optional bobbin around which windings can be wound. A bobbin can comprise any suitable electrically insulating material, e.g. plastic, and may serve to facilitate evenly sized windings and to prevent shorting between windings and ferrite. While example embodiments are shown and described in conjunction with a E-shaped core, it is understood that other practical core shapes and/or types can be used, such as CC (or UU), EC, ETD, PQ, POT core, and the like.

In some embodiments, a single piece of ferrite or magnetic material can be configured to take the shape of the combination of areas 402 and 404.

Figure 4B:
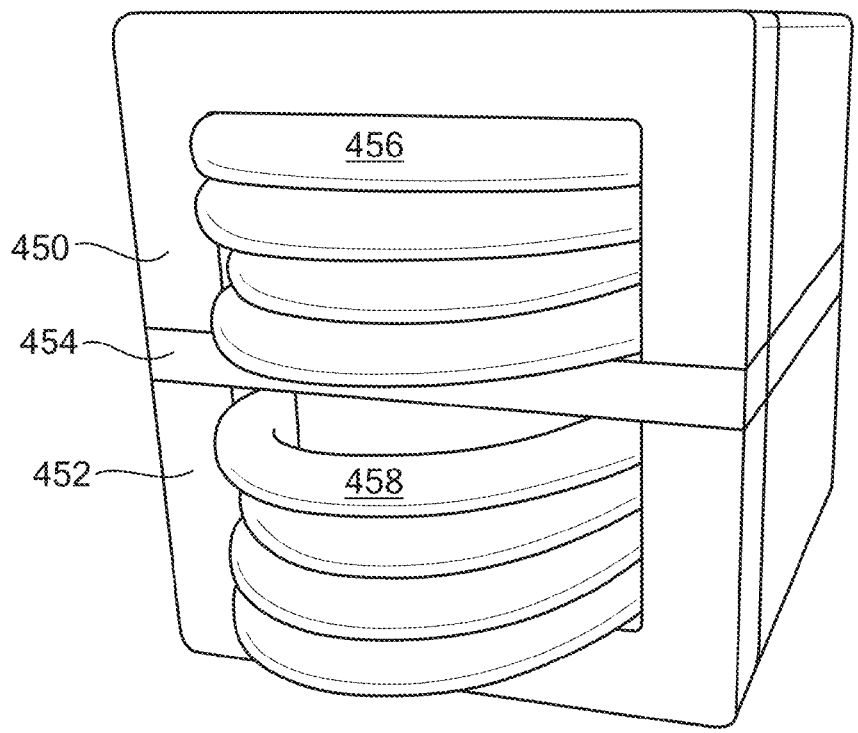
FIG. 4B is a pictorial representation of an inductor system having first and second inductors with a ferrite layer for flux cancellation.

FIG. 4B show an inductor system having first and second balanced inductors 450, 452 with a shared ferrite layer 454 sandwiched between the first and second inductors. The shared ferrite layer 454 magnetically decouples the first and second balanced inductors 450, 452 from each other. In embodiments, coupling between the first and second inductors can be less than 0.06, 0.05, 0.04, 0.03, 0.02, 0.01. The first and second inductors 450, 452 are separated by a gap. In embodiments, the windings 456, 458 of the first and second inductors 450, 452 are configured in at least winding direction so as to cancel flux generated by the windings so that a net flux may be substantially zero. That is, the flux of one winding cancels the flux of the other winding, and vice versa, for net flux cancellation. Windings 456, 458, of the integrated inductor may be symmetrical with the respect to the shared ferrite layer 454, such that inductance (and impedance) values of the first inductor 450 and inductance (and impedance) values of the second inductor 452 are substantially matched.

Figure 5A:
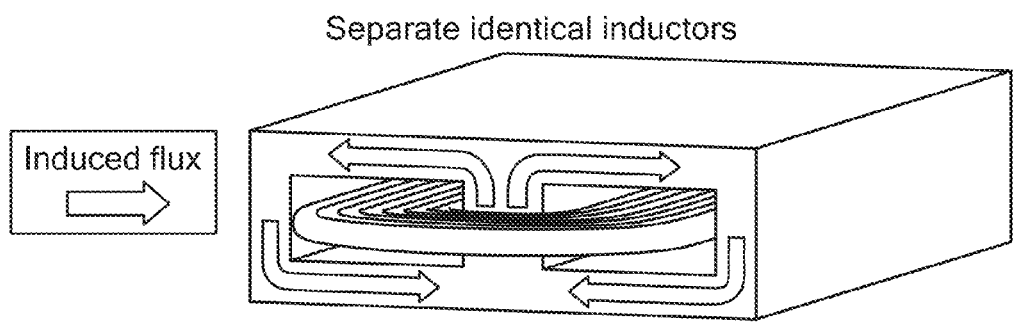
FIG. 5A is a schematic representation of separate inductors having the same impedance.
Figure 5B:
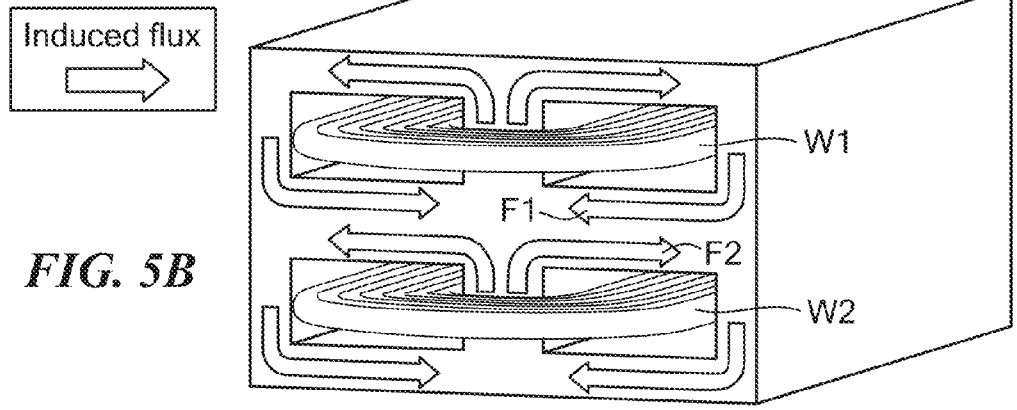
FIG. 5B is a schematic representation of ideal separate inductors pressed together.

FIG. 5A shows ideal separate first and second inductors that are matched in impedance so as carry the same current resulting in similar magnetic flux within the ferrite for each of the inductors. FIG. 5B shows an ideal case in which first and second inductors are pressed together perfectly (no air in between) and the currents have a similar orientation to that shown in FIG. 5A. The inductors carry flux going in opposite directions with equal intensity resulting in a net flux of about zero in portions of the shared ferrite having contact. It is understood that it is impossible in practice to achieve this ideal case by pressing together separate inductors because there is always a layer of air between the two inductors that prevents perfect flux cancellation.

Figure 5C:
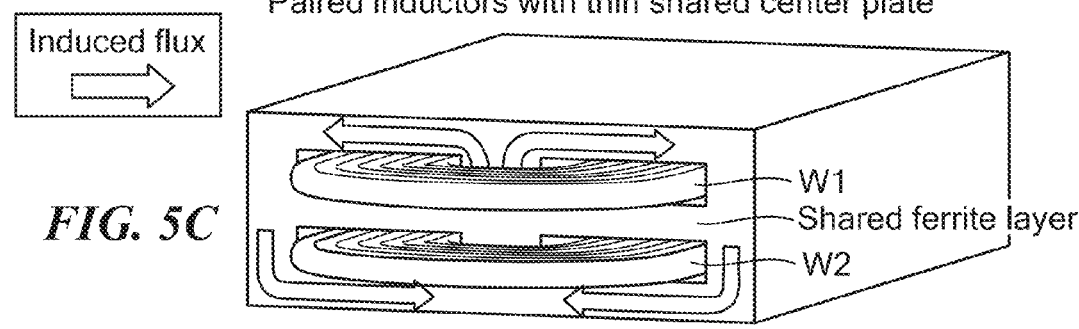
FIG. 5C is a schematic representation of first and second inductors having a shared ferrite layer for flux cancellation.

FIG. 5C shows first and second windings W1, W2 sharing a plate of ferrite between the first and second inductors that results in flux cancellation. It should be noted that while the first and second windings W1, W2 share a portion of ferrite, the inductors are not significantly magnetically coupled since the shared portion of ferrite effectively prevents flux linked by one winding from being linked by the other. As can be seen, the windings W1, W2 of the first and second inductors are wound so to the cancel the flux generated by the windings, as shown. That is, flux generated by the first winding W1 cancels (in the shared ferrite plate) flux generated by the second winding W2 and vice versa. Because the shared ferrite sees relatively low net flux, the thickness of the ferrite can be significantly less than a separate inductor configuration without causing saturation. This enables the ferrite material volume and weight reduction.

The flux cancellation provide in the configuration of FIG. 5C can be seen in relation to FIG. 5B in the region between the first and second windings. A first flux F1 is generated by the first winding W1 and a second flux F2 is generated by a second winding W2. As can be seen, F1 and F2 are opposite in direction. F1 and F2 are cancelled in the shared ferrite layer of the shared ferrite inductor system of FIG. 5C, and thus, no flux (net flux of zero) between the first and second windings W1 and W2 is show in FIG. 5C.

At power, the portion of ferrite of low flux sees negligible losses due to heat, for example. It will be appreciated that the shared portion of the ferrite material corresponding to areas of flux cancellation remains relatively cool while greater heat is dissipated in the remaining ferrite material relative to the shared ferrite. Thus, the shared ferrite promotes efficient circuit operation.

Figure 6:
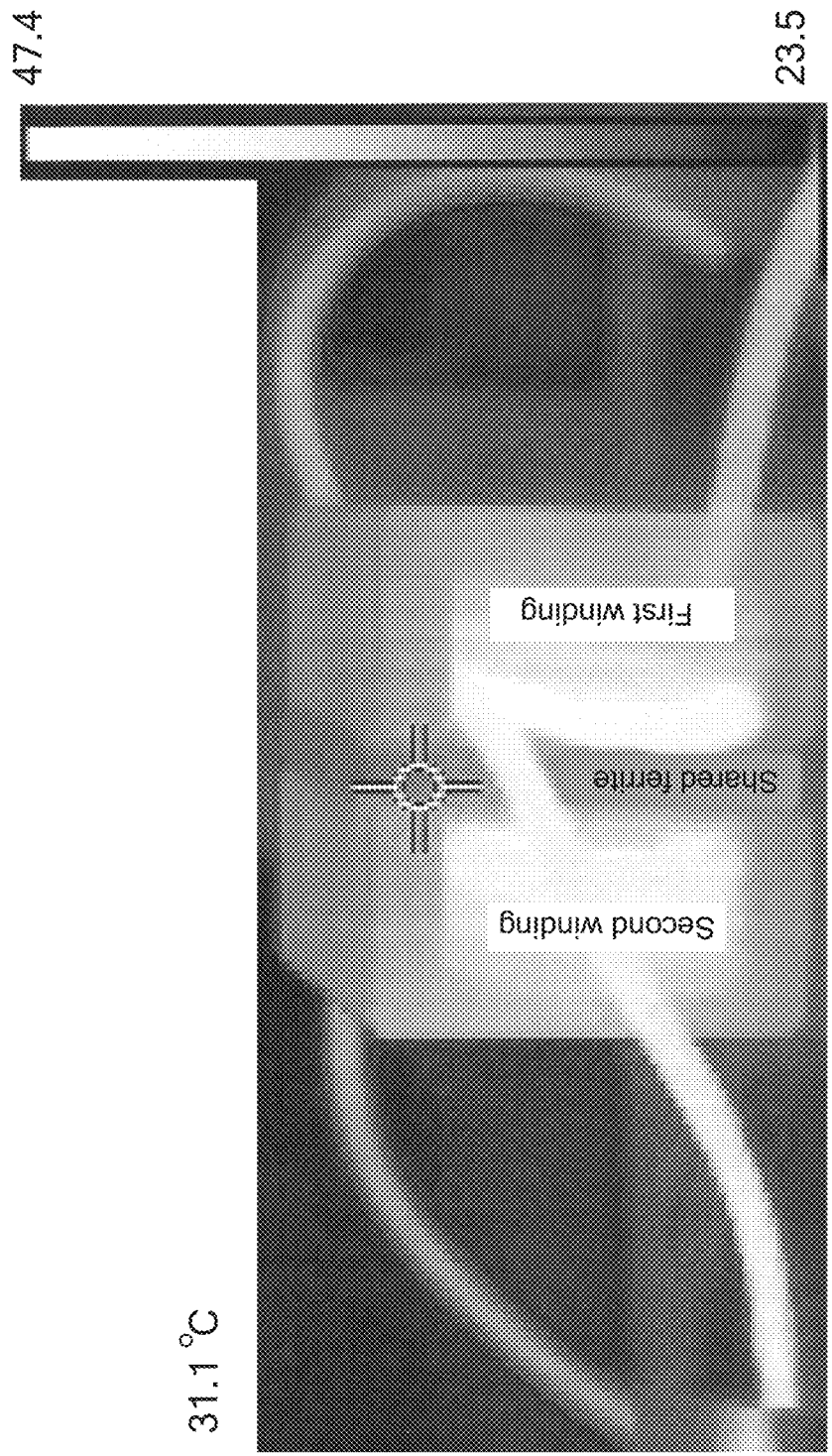
FIG. 6 is an infrared picture showing temperature information for a shared ferrite inductor system.

FIG. 6 shows an example infrared picture of a shared ferrite inductor system having first and second windings with a shared ferrite layer. As can be seen the ferrite layer between the windings is relatively cool. It is understood that the ferrite layer may heat up somewhat over time due to heat transfer from nearby components.

It will be appreciated that ferrite may be a relatively brittle material subject to breakage. In embodiments, a thickness of the material may be larger to promote structural integrity rather than for handling flux levels, which may net to substantially zero, for example.

It understood that inductor embodiments with planar windings, such as shown in FIG. 5C, and non-planar windings, such as shown in FIG. 4B, can be used for a particular application. In embodiments, various factors, such as core material, standard size availability, number of turns, and the like, can be considered to achieve a desired implementation. In embodiments, an inductor system may comprise more than two inductors, e.g., four, with multiple ferrite layers to meet the needs of a particular application, such as for reasons of space reduction or meeting a particular geometry.

Figure 7:
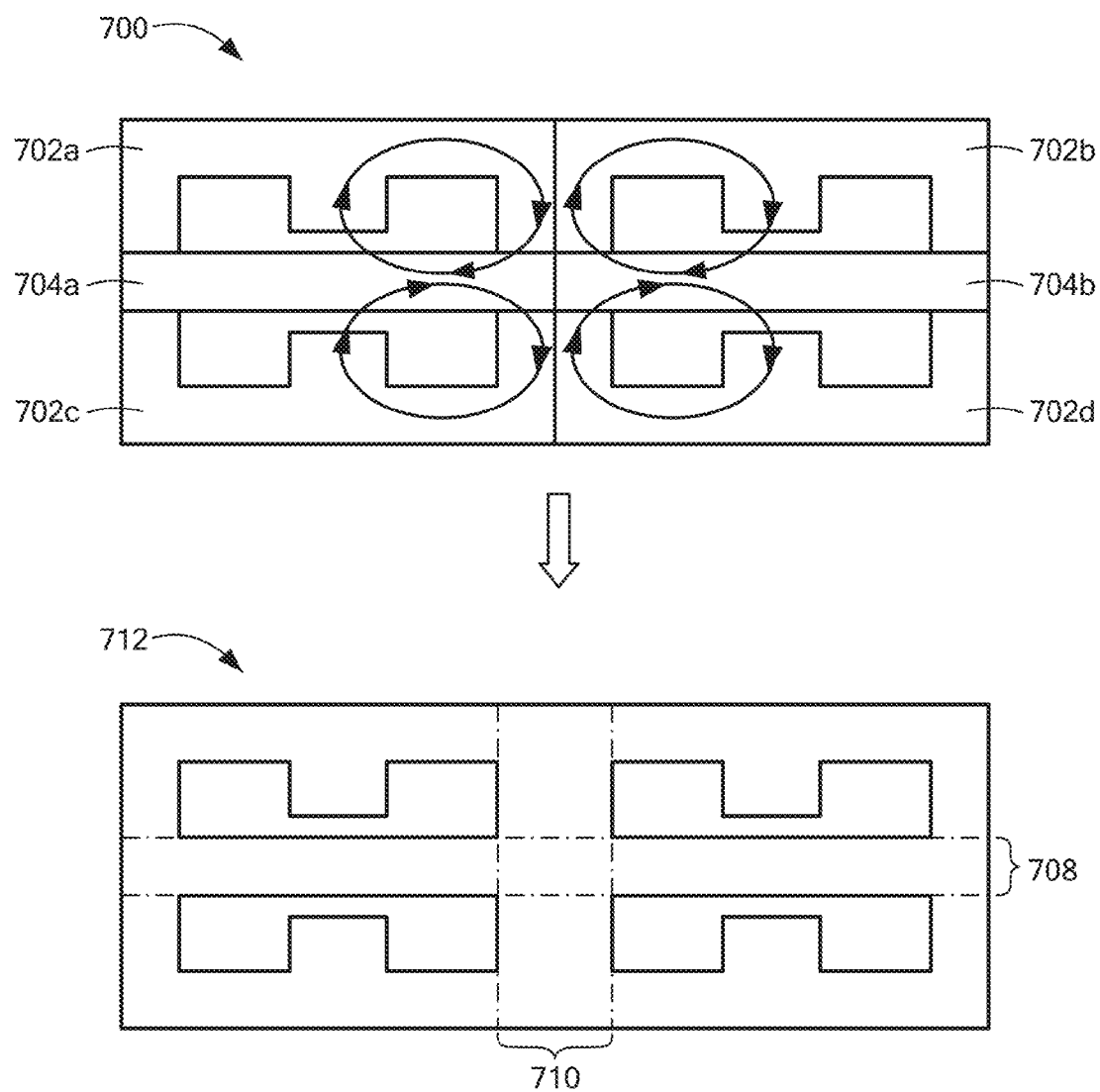
FIG. 7 is schematic representation of a shared ferrite inductor system with multiple flux cancellations.

FIG. 7 shows an example shared ferrite inductor system 700 having four cores 702a, 702b, 702c, 702d with one or more shared ferrite pieces 704a and 704b and corresponding flux cancellation, as shown. In embodiments, portions 708 and 710 of the four-winding inductor system 712 that experience cancelled magnetic flux can be replaced with pieces of ferrite that may be thinner than originally necessary for four separate inductors. For example, one or more pieces of shared ferrite can be positioned in the area labelled 708 (with dashed-dotted lines). One or more pieces of shared ferrite can be positioned in the area labelled 710 (with dashed lines). In some embodiments, a single piece of ferrite or magnetic material can be configured to take the shape of the combination of areas 708 and 710.

Figure 8:
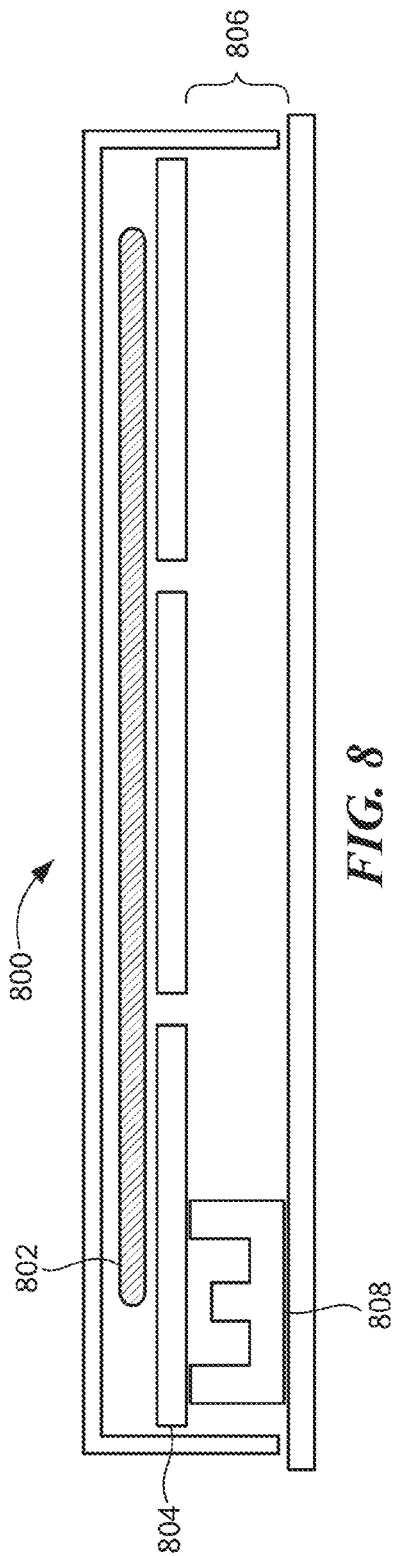
FIG. 8 is a schematic representation of a wireless power transmitter having a resonator coil positioned on one or more planar pieces of magnetic material.

In some embodiments, a wireless power transmitter or receiver can have magnetic material used as part of wireless power transmission or reception. For example, FIG. 8 shows a wireless power transmitter 800 having a resonator coil 802 positioned on one or more planar pieces of magnetic material 804. In embodiments, a portion of this magnetic material 804 may have low magnetic flux related to the magnetic field generated by the resonator coil 802 for power transmission. Under the one or more pieces of magnetic material 802 is space 806 available for other system components such as IMN or driving components. In embodiments, an E-core 808 used in an inductor in the IMN, such as for inductors L3sa, L3sb, L3da, or L3db, can be positioned on or near magnetic material 804. A portion of magnetic material 804 can be used to complete an inductor used in the IMN or other circuits. For example, depending on the phase of the magnetic flux generated by the resonator coil 802 and inductor L3sa, a portion of the flux in that portion of the magnetic material 804 can be cancelled out. The phase of magnetic flux generated by the resonator coil 802 can be due to the power level, load condition, and state of the wireless power system's variable parameters (such as current, voltage, efficiency, duty cycle, and the like). Thus, a portion of underutilized magnetic material can be used to save space and cost related to the construction of an inductor in the IMN or other circuit in the wireless power system.

In another aspect, a power system includes an interleaved rectifier that may have flux cancellation for at least partially balanced inductors. The rectifier, which can be coupled to a receive impedance matching network, can provide a DC output signal for powering a load, for example.

Figure 9:
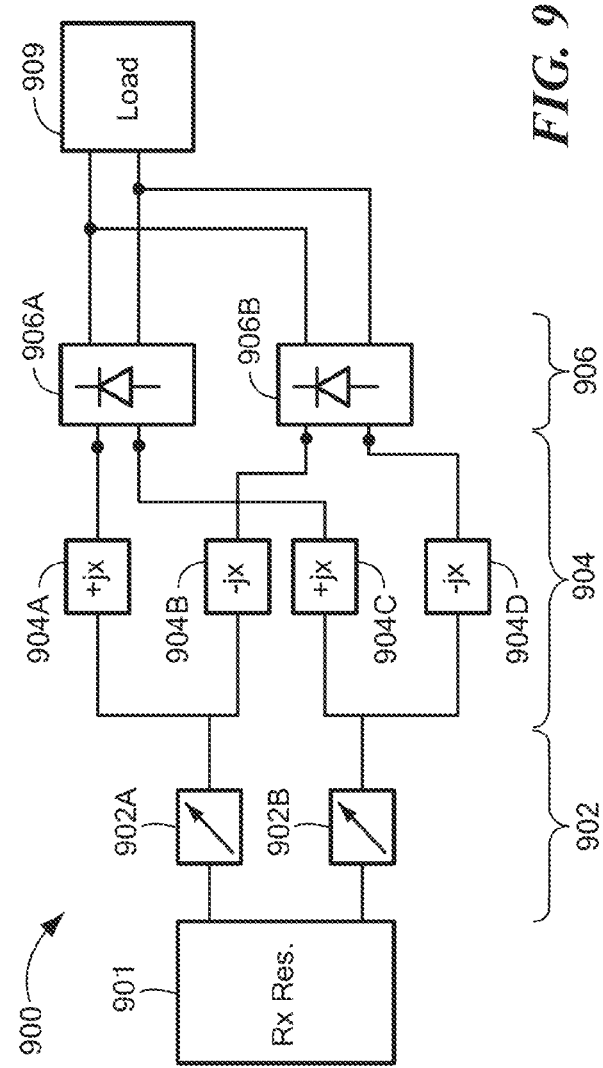
FIG. 9 is a schematic of a circuit implementation of a wireless power receiver having an interleaved rectifier.

FIG. 9 shows a block diagram of an exemplary embodiment of a wireless power receiver having an interleaved rectifier that may have inductor flux cancellation. The receiver includes a resonator connected to a first stage 902 of an impedance matching network (IMN) having balanced electronic components 902A, 902B. In embodiments, these electronic components 902A, 902B can include tunable capacitors and/or inductors. This first stage 902 of the IMN is connected to a second stage 904 of the IMN having balanced electronic components. Balancing components can be important to reject any common-mode signal that may be present due to, for example, perturbations of driving circuitry. Note that each of the top branches (904A and 904C) has positive reactance +jX and each of the bottom branches (904B and 904D) has negative reactance −jX. The positive reactance +jX branches 904A, 904C of the second stage 904 are connected to a first rectifier 906A. The negative reactance −jX branches 904B, 904D of the second stage 904 are connected to a second rectifier 906B. Note that, in embodiments, the absolute value of positive and negative reactance values may be equal to one another. In embodiments, the absolute value of the positive reactance may be greater or less than the negative reactance. The outputs of these rectifiers 906A, 906B are added together to connect to the load 909, such as a battery or battery manager. Note that an effect of the "interleaved rectification" is the recombining of rectified signals that can potentially be out of phase with respect to one another. This can lead to a smoothing effect on the combined signal output.

Figure 10A:
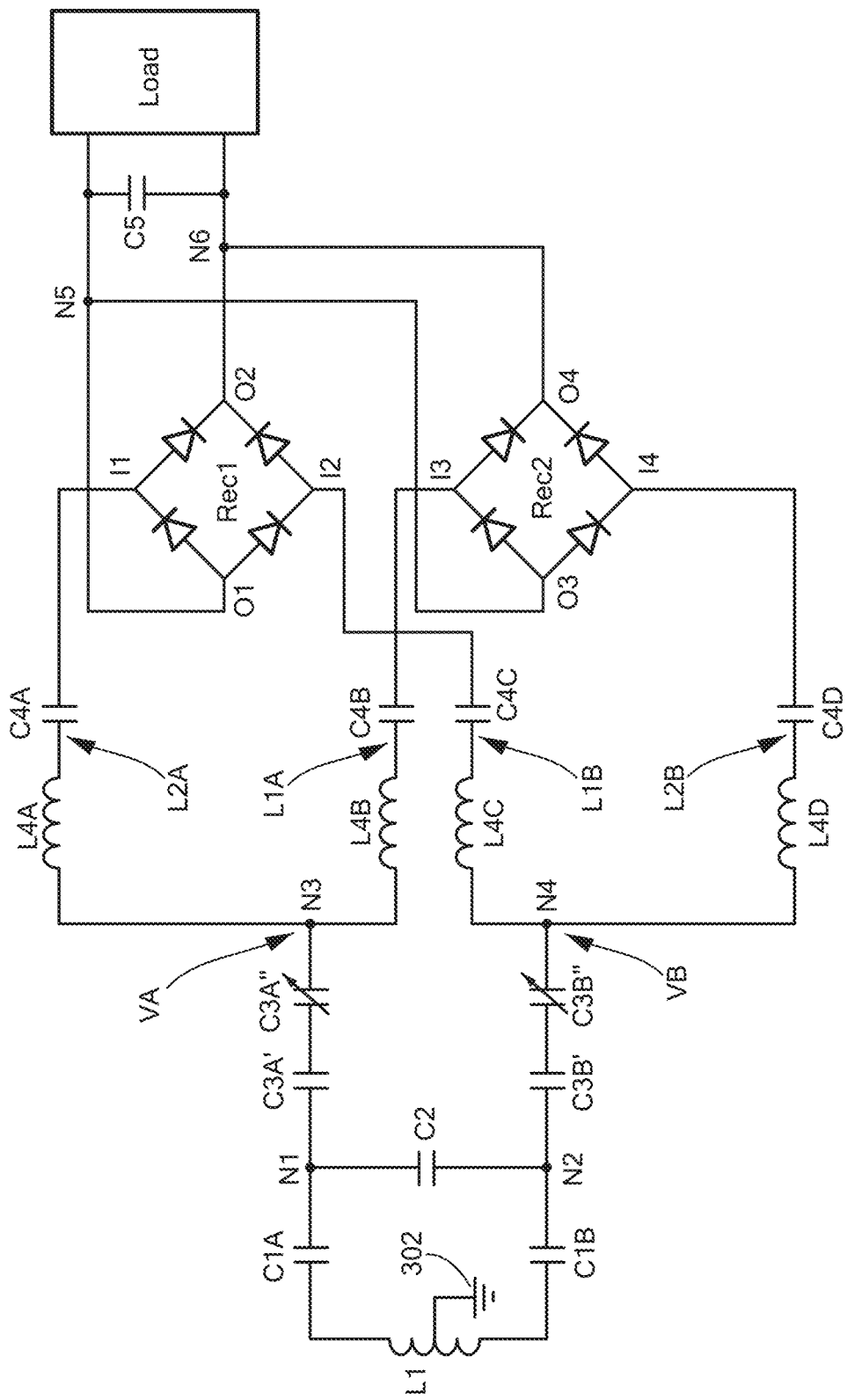
FIG. 10A is a schematic of a circuit implementation of a wireless power receiver having an interleaved rectifier.
Figure 10B:
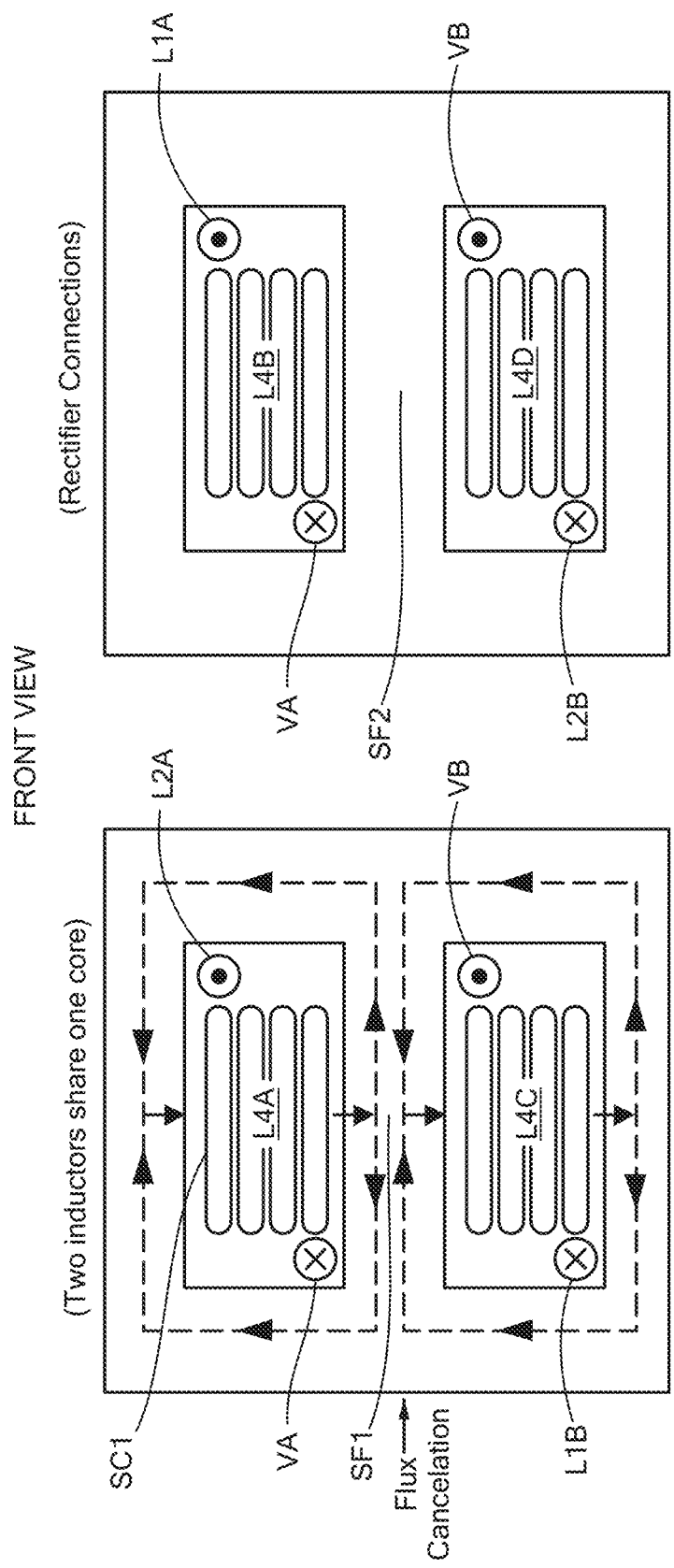
FIG. 10B is a schematic of balanced inductors, which form a part of the wireless power receiver of FIG. 10A, having flux cancellation.

FIG. 10A shows a schematic diagram of an exemplary embodiment of a wireless power receiver having an interleaved rectifier that may have inductor flux cancellation, as shown in FIG. 10B. In embodiments, the center-piece ferrite magnetically decouples paired inductors to enable an interleaved rectifier configuration. In embodiments, coupling between first inductor and the second inductor is below 0.04.

The receiver includes an inductor L1 connected in series to a capacitor C1A and capacitor C1B and connected in parallel to a capacitor C2. Connected to each of nodes N1 and N2 are optional fixed capacitor C3A' connected in series to a tunable capacitor C3A" and optional fixed capacitor C3B' connected in series to capacitor C3B" (see examples above for tunable capacitors). Note that components on the top branch are balanced with a component of same or similar value on the bottom branch. For example, capacitor C1A is balanced with capacitor C1B. This balancing is also denoted by the virtual ground 302 indicated at the midpoint of the resonator coil L1. Connected to node N3 is a first branch including an inductor L4A connected a capacitor C4A and a second branch including an inductor L4B connected to capacitor C4B. Note that the inductors and capacitors can be connected in series or parallel to one another. In the first branch, to achieve positive reactance, the reactance of the inductor L4A at the operating frequency may be greater than the reactance of capacitor C4A. In the second branch, to achieve negative reactance, the reactance of the inductor L4B at the operating frequency may be less than the reactance of capacitor C4B.

Connected to node N4 is a third branch including an inductor L4C connected to capacitor C4C and a fourth branch including an inductor L4D connected to a capacitor C4D. Note that the inductors and capacitors can be connected in series or parallel to one another. For example, the inductor L4 connected to capacitor C4 in series creates a filter to pass a current with the desired frequency to the input of the rectifier. In the third branch, to achieve positive reactance, the reactance of the inductor L4C at the operating frequency may be greater than the reactance of the capacitor C4C. In the fourth branch, to achieve negative reactance, the reactance of the inductor L4D at the operating frequency may be less than the reactance of the capacitor C4D. Note that any of the inductors L4 and/or capacitances C4 can include tunable components.

The output of first branch is connected to the input I1 of the first rectifier Rec1 and the output of the second branch is connected to the input I2 of Rec1. The output of the third branch is connected to the input I3 of the second rectifier Rec2 and the output of the fourth branch is connected to the input I4 of Rec2. Note that each of the rectifiers can be a half-bridge, full-bridge, passive (diode) or active (switching) type rectifier. In embodiments, a wireless power system with an output of greater than 10, 15, 20 kW may use a switching rectifier to maintain high efficiency of power to the load. In other words, at certain power levels, a diode rectifier may not be able operate as efficiently at very high power levels. Output O3 of rectifier Rec2 is connected at node N5 such that outputs O1 and O3 are electrically added. Output O4 of rectifier Rec2 is connected at node N6 such that outputs O2 and O4 are electrically added. Combined outputs O1+O2 and O3+O4 are connected in parallel to a smoothing capacitor C5. Connected in parallel to the smoothing capacitor C5 is a load 114, such as a battery or battery manager.

As shown in the example embodiment of FIG. 10B, inductor L4A and inductor L4C share a core SCI and share a ferrite layer SF1. In the illustrated embodiment, the flux generated by inductor L4A and inductor L4C is substantially cancelled in the shared ferrite layer SF1 since the flow is in opposite directions. Inductor L4A and inductor L4C are additionally magnetically decoupled. Inductors L4B and L4D, which may share a core, have a similar configuration in which flux in a shared ferrite layer SF2 between them is substantially canceled. Inductor L4B and inductor L4D are additionally magnetically decoupled.

Figure 10C:
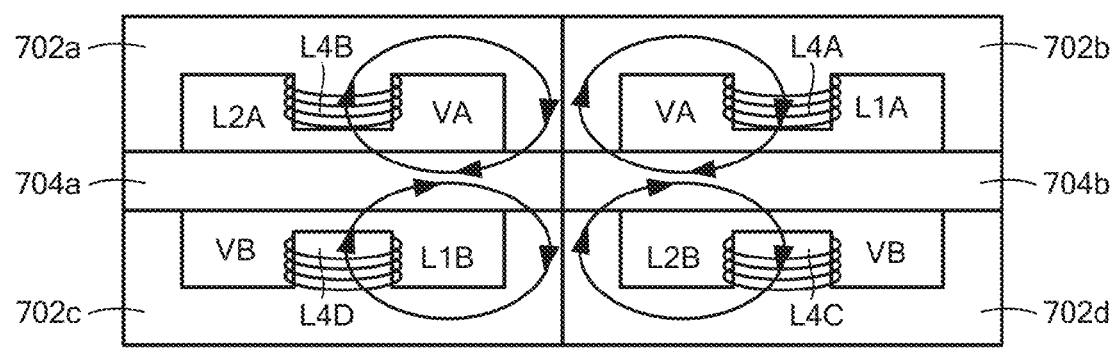
FIG. 10C is a schematic of a wireless power receiver having an interleaved rectifier in a configuration having some similarity with FIG. 7.

In embodiments, inductors L4A, L4C, L4B, L4D for a wireless powered device with an interleaved rectifier can be arranged in a manner as shown in FIG. 10C, which may have some similarity to that shown in FIG. 7. It understood that a variety of winding configurations can produce multiple flux cancellations to meet the needs of a particular application. The four inductors L4A, L4B, L4C, and L4D are not significantly magnetically coupled since the shared portions of ferrite effectively prevents flux linked by one inductor from being linked by the other.

Having described exemplary embodiments of the invention, it will now become apparent to one of ordinary skill in the art that other embodiments incorporating their concepts may also be used. All publications and references cited herein are expressly incorporated herein by reference in their entirety. Elements of different embodiments described herein may be combined to form other embodiments not specifically set forth above. Various elements, which are described in the context of a single embodiment, may also be provided separately or in any suitable subcombination.

What is claimed is:

1. A system comprising:
a first inductor driven by a first oscillating current generated by a first energy source;
a second inductor driven by a second oscillating current generated by a second energy source, and
a layer of magnetic material disposed between the first inductor and the second inductor, wherein the first and second inductors are configured such that, when each is driven with its respective oscillating current, magnetic flux generated by the first inductor is substantially canceled by magnetic flux generated by the second inductor in the layer of magnetic material.

2. The system of claim 1 wherein the first and second inductors are disposed in first and second E-shaped cores, respectively.

3. The system of claim 2 wherein the magnetic material layer in combination with the first and second inductors determine respective inductances of first and second inductors during operation of the system.

4. The system of claim 1 wherein a net of the canceled flux from the first and second inductors is substantially zero in a portion of the magnetic material layer when the oscillating current through each of the first and second inductors substantially matches.

5. The system of claim 1, wherein the first and second inductors are coupled to a source coil of a wireless resonant power transmitter.

6. The system according to claim 5, wherein the power transmitter forms a part of a charging platform.

7. The system according to claim 1, wherein the first and second inductors comprise respective planar windings.

8. The system according to claim 1, wherein the layer of magnetic material is shared with further circuit components.

9. A method comprising:
disposing a layer of magnetic material between first and second inductors, wherein the first inductor is electrically coupled to a first energy source and the second inductor is electrically coupled to a second energy source; and
driving with an oscillating current the first and second inductors such that a first magnetic flux generated by the first inductor is canceled by a second magnetic flux generated by the second inductor,
wherein the magnetic material layer in combination with the first and second inductors determine respective inductances of first and second inductors during operation of the system.

10. The method of claim 9, wherein a net of the canceled flux from the first and second inductors is substantially zero in a portion of the magnetic material layer when oscillating current through each of the first and second inductors substantially matches.

11. The method of claim 9 wherein the first and second inductors are disposed in first and second E-shaped cores, respectively.

12. The method of claim 10 wherein the magnetic material layer in combination with the first and second inductors determine respective inductances of first and second inductors during operation of the system.

13. The method of claim 9, wherein the first and second inductors are coupled to a source coil of a wireless resonant power transmitter.

14. The method according to claim 13, wherein the power transmitter forms a part of a charging platform.

15. The method according to claim 9, wherein the first and second inductors comprise respective planar windings.

16. The method according to claim 9, wherein the layer of magnetic material is shared with further circuit components.

17. A system comprising:
a first inductor driven by a first oscillating current;
a second inductor driven by a second oscillating current and substantially decoupled from the first inductor; and
a layer of magnetic material disposed between the first inductor and the second inductor; wherein when the first and second inductors are driven with their respective oscillating current, magnetic flux generated by the first inductor is substantially canceled by magnetic flux generated by the second inductor in the layer of magnetic material.

18. The system of claim 17 wherein the first and second inductors are disposed in first and second E-shaped cores, respectively.

19. The system of claim 17 wherein a net of the canceled flux from the first and second inductors is substantially zero in a portion of the magnetic material layer when the oscillating current through each of the first and second inductors substantially matches.

20. The system of claim 17 wherein the magnetic material layer in combination with the first and second inductors determine respective inductances of first and second inductors during operation of the system.

* * * * *